United States Patent [19]

Honeyman

[11] Patent Number: 4,768,570

[45] Date of Patent: Sep. 6, 1988

[54] CUTTING SUPPORT AND GUIDE

[76] Inventor: George R. Honeyman, 8743 E. Eastman Pl., Denver, Colo. 80231

[21] Appl. No.: 64,351

[22] Filed: Jun. 22, 1987

[51] Int. Cl.⁴ ............................................... B27C 1/12
[52] U.S. Cl. ........................... 144/145 R; 144/134 D; 144/137; 409/130; 409/182
[58] Field of Search ................. 409/79, 125, 130, 182; 144/137, 144 R, 144.5, 145 R, 134 D, 136 C

[56] References Cited

U.S. PATENT DOCUMENTS

| | | |
|---|---|---|
| 1,904,109 | 4/1933 | Wendorf . |
| 3,099,299 | 7/1963 | Gilfrey . |
| 3,450,001 | 6/1969 | Fortune . |
| 3,509,923 | 5/1970 | Bailey . |
| 4,044,805 | 8/1977 | Gronholz ........................ 144/136 C |
| 4,456,043 | 6/1984 | Stocks ............................. 144/136 C |
| 4,479,523 | 10/1984 | Peterson . |
| 4,579,158 | 4/1986 | O'Meara . |
| 4,644,985 | 2/1987 | Weaver ........................... 144/145 R |

*Primary Examiner*—W. Donald Bray
*Attorney, Agent, or Firm*—Fields, Lewis, Pittenger & Post

[57] ABSTRACT

A cutting support and guide attachable to routers for use in cutting paneling. A workpiece is moved between two opposing plates, the top plate having a router mounted thereon with its cutting blade extending through an aperture in the top plate. A fence is disposed between the two plates and has a datum surface against which an edge of the workpiece abuts. The position of fence relative to the plates is adjustable, thereby determining the width of the strip to be cut from the workpiece. In one example, the two plates are connected by a series of connecting pins which pass through the cut in the workpiece as the workpiece moves through the guide.

6 Claims, 2 Drawing Sheets

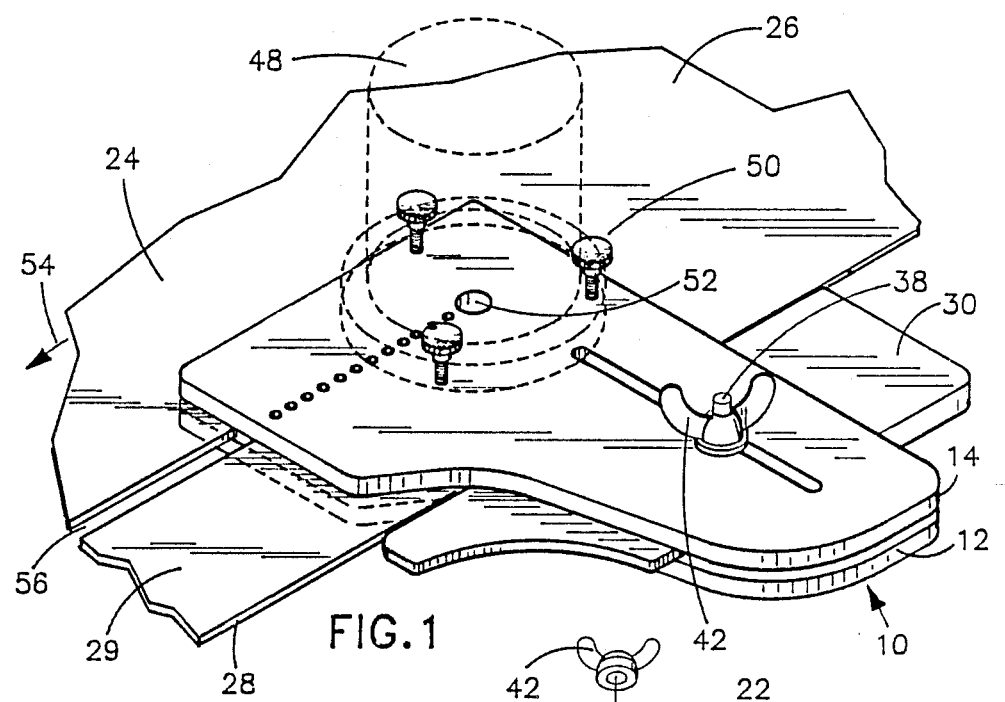
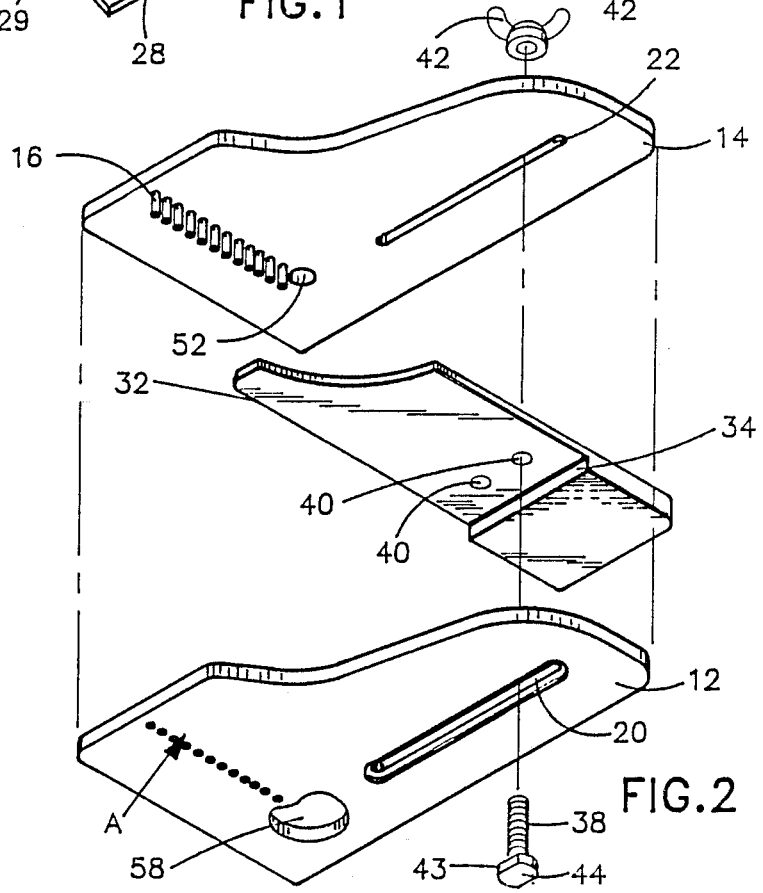

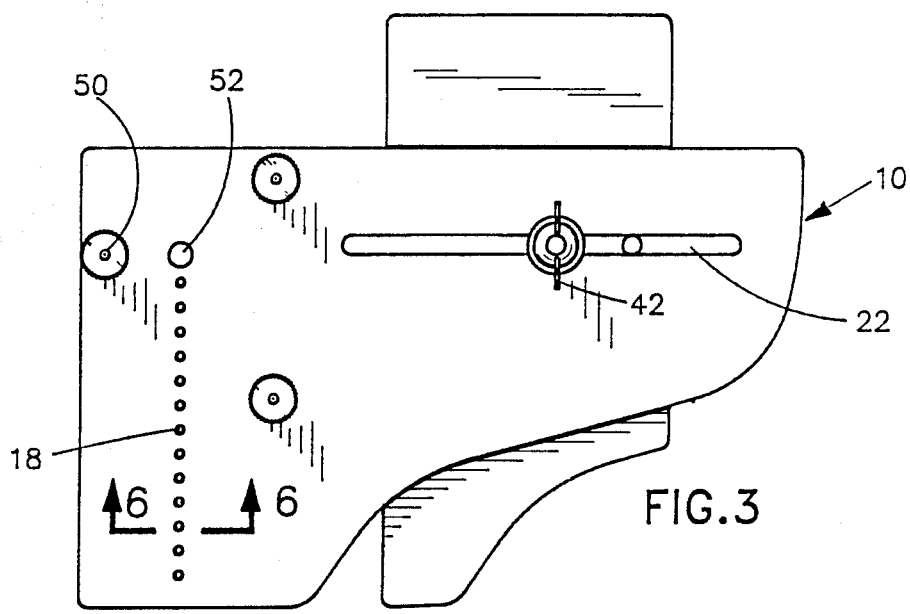
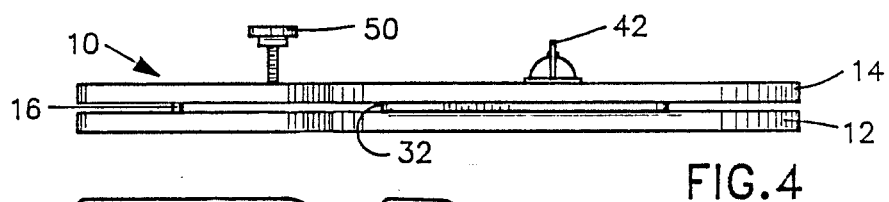
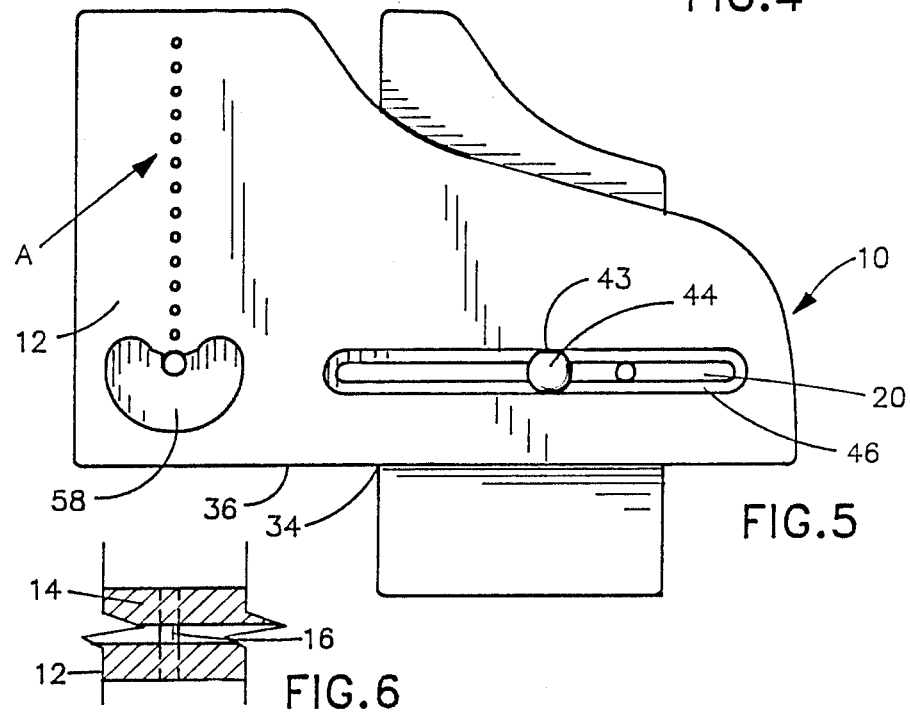
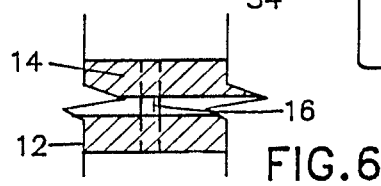

CUTTING SUPPORT AND GUIDE

FIELD OF THE INVENTION

This invention relates to cutting supports and guides and more particularly to a cutting support and guide for attachment to a router or other cutting tool suitable for cutting panel-like materials.

BACKGROUND ART

Thin panels are regularly used in construction and carpentry, as for counter tops, wall paneling and the like. These panels are typically made of wood, plastic laminate, cardboard, metal, or other strong material. Cutting of the panels to the desired shape and size is usually necessary in each use of the paneling, as for instance in sizing a plastic laminate to fit a countertop. This job requires fast, accurate, neat cutting of the panels at the job site, with the cutting usually being performed by a router, circular saw, jig saw or similar tool. Various cutting guides have been proposed for this purpose and are well known in the prior art. For example, U.S. Pat. No. 3,450,001 to Fortune discloses a cutting guide for guiding a router over a work piece in a straight line. This guide design would allow for relatively straight and neat cutting under certain conditions, but it does have some limitations. For example, in order to be effective, the guide would necessarily need to be longer than the desired cut. If the guide were not longer than the cut, the limits of the guide would eventually be reached and the workpiece would need to be released from the guide and re-adjusted before cutting could be resumed. This would require additional time, and could introduce inaccuracies into the cutting process if the piece were not properly re-aligned between cuts. To the extent that the guide must be long to be effective, it also becomes less portable. Portability of the cutting guide is important since cutting must be done at the job site, and preferably at a particular work location within the job site area. Another cutting guide is shown in U.S. Pat. No. 1,904,109 to Wendorf, which provides a guide that is readily portable and can cut various shapes and sizes. However, this guide is more readily used for cutting circles, arcs, and the like. To use it for cutting a straight line would be quite slow since it would be necessary to move the guide bars for each cut and re-align them for accuracy. Further, this guide provides no support for the workpiece, but simply rests on the upper surface thereof. Providing a support surface for the workpiece is important for stability of the work and also to help prevent accidentally cutting through and damaging a surface beneath the workpiece.

There are other prior art cutting guides, many of which are uniquely designed to permit a specific function to be performed on a workpiece. However, these guides often require complex supports and guides for aligning workpieces with the cutting tools.

Some other examples of prior art cutting guides include Bailey U.S. Pat. No. 3,509,923; O'Meara U.S. Pat. No. 4,579,159; Gilfry U.S. Pat. No. 3,099,299; and Peterson et al. U.S. Pat. No. 4,479,523.

SUMMARY OF THE INVENTION

This invention is directed to a cutting support and guide for attachment to a router or other cutting tool for use in cutting panel-like material such as wood, plastic laminate, cardboard or metal. Attachment to the cutting tool may be effected by any secure means, for example bolting, or the guide and cutting tool may be a single-piece unit. The invention includes a base plate for supporting the workpiece, and an upper plate connected to the lower plate, with the workpiece passing between the two plates. A cutting tool, for example a router, is mounted on the upper plate with the cutting portion extending through an aperture in the plate. A fence is sandwiched between the two plates and has a datum surface for abutting the workpiece and guiding it past the cutting tool. The position of the fence relative to the plates is adjustable by use of a wing nut and bolt assembly passing through the fence and operating in conjunction with corresponding slots in the opposing plates. In use, the plates and fence are secured in position by tightening the wing nut. By slightly loosening the wing nut, the fence may be moved to a new position, thereby changing the width of the strips cut from the workpiece. In addition, a shoulder portion may be provided on the fence to abut an edge of one of the plates to further prevent rotational movement of the fence in operation. Alternatively, a second wing nut and bolt assembly could be added to prevent rotation of the fence. Preferably, the two plates are connected by connectors disposed in a line parallel to the datum surface and passing through the cutting aperture. This allows the connectors to pass through the cut made in the workpiece as it is moved through the guide. By providing connectors of a diameter just slightly smaller than the width of the cut made in the workpiece, additional guidance and stability for the workpiece may be effected. For neater and smoother operation, a chip dispersal aperture may be provided in the base plate to allow chips, dust and other refuse from the cutting process to more easily pass from the system.

From this discussion, several advantages of the present invention are readily apparent. A portable compact device is provided for guiding and supporting cutting operations of panels by a router or similar cutting tool. The invention is also easily and quickly adjustable to allow strips of various widths to be cut from a workpiece. In addition, the base plate provides support to the cutting operation, and also prevents accidentally cutting through the workpiece and damaging a surface beneath. Finally, due to the unique configuration of the plate connectors, as well as the fence being securely locked in place, the workpiece remains stable throughout the cutting operation, thereby permitting greater accuracy and neatness of the cutting.

Additional advantages of this invention will become readily apparent from the description which follows, together with the accompanying drawings.

BRIEF DESCRIPTION OF THE DRAWINGS

FIG. 1 is a perspective view of the cutting support and guide of the present invention in operation with a router, showing the movement of the workpiece through the guide;

FIG. 2 is a perspective assembly view of the two plates and the fence of the invention;

FIG. 3 is a top plan view of the apparatus of the present invention;

FIG. 4 is a side view of the apparatus of the present inveition;

FIG. 5 is a bottom plan view of the apparatus of the present invention; and

FIG. 6 is a cross-sectional view taken along line 6—6 of FIG. 3 showing the pin connectors in place between the two plates.

DESCRIPTION OF THE PREFERRED EMBODIMENT

With continued reference to the drawings, the present invention is embodied in cutting support and guide 10 having base support plate 12 and top plate 14 connected by connecting pins 16 which fit into connecting pin holes 18. The base plate 12 has an elongated adjusting slot 20, while the top plate 14 has a corresponding adjusting slot 22. Workpiece 24, shown between the plates 12 and 14, has working surface 26 and reference surface 28. The workpiece 24 is a piece of paneling from which a strip 29 is to be cut. The workpiece may be paneling of any size and is usually made of wood, plastic laminate, cardboard or metal. Fence 30 fits between the two plates 12 and 14 and has a datum surface 32 which abuts workpiece reference surface 28 to hold the workpiece 24 in position for a straight cut. Preferably, fence shoulder 34 fits squarely against base plate edge 36 to ensure that the position of datum surface 32 remains fixed during operation. Adjusting bolt 38 passes through base adjusting slot 20, selected adjusting bolt hole 40 in fence 30, and top plate adjusting slot 22. After wing nut 42 is screwed into place on adjusting bolt 38, the apparatus 10 may be adjusted for operation by moving the fence 30 to a selected position and securing the adjustment by tightening the wing nut 42. Alternatively, a second bolt and wing nut assembly (not shown) utilizing bolt hole 40 could be utilized to prevent rotation of the fence. The tightening of the wing nut 42 is facilitated by the two flat sides 43 of bolt head 44, which fit snugly into shoulder portion 46 of base adjusting slot 20 to prevent rotation of bolt head 44. The router 48 is mounted on the top plate 14 and is secured in place by mounting screws 50 so that its cutting blade extends through cutting aperture 52.

In operation, the workpiece is moved through the guide in the direction shown by flow-indicating arrow 54, with the workpiece reference surface 28 abutting the fence datum surface 32. The width of the strip 29 to be cut off of the workpiece 24 will be determined by the distance from the cutting aperture 52 to the fence datum surface 32. As the workpiece 24 moves through the guide 10, connecting pins 16 pass through workpiece cut 56, thereby helping to hold the workpiece 24 steady, and particularly helping to hold the workpiece against the datum surface 32. This greatly aids in producing a straight cut in the workpiece. Preferably, connecting pins 16 are just slightly smaller than the cut 56 so as to provide guidance without binding the flow of the workpiece 24. Chips, dust and the like resulting from the cutting may advantageously be allowed to escape from the system through chip dispersal aperture 58.

This invention has been described in detail with reference to a particular embodiment thereof, but it will be understood that various other modifications can be effected within the spirit and scope of this invention.

I claim:

1. A cutting and support guide for attachment to a cutting tool for use in making a cut in a panel-type workpiece having a work surface and a reference surface intersecting said work surface by moving the workpiece past a cutting portion of said cutting tool, said guide comprising:
   an upper plate having an aperture for receiving a cutting tool and having means for attachment to said cutting tool;
   a base support plate opposite said upper plate, said plates having means for connecting said plates, in fixed relation to each other;
   a fence member disposed between said plates, said member having a datum surface for abutting said workpiece reference surface to direct the movement of said workpiece between said plates and past said cutting tool; and
   means for adjusting and securing the position of said fence relative to said plates.

2. A cutting and support guide as claimed in claim 1, wherein:
   said connecting means is disposed to pass through the cut made in the workpiece as the workpiece is moved through the guide.

3. A cutting support and guide as claimed in claim 1, wherein:
   said connecting means includes a series of pins in said top plate for fitting into a series of corresponding holes in said base plate, said pins being parallel to said datum surface and being aligned to pass through said cut in said workpiece as the workpiece is passed through the guide.

4. A cutting and support guide as claimed in claim 3, wherein:
   said pins are of a diameter slightly less than the width of said cut.

5. A cutting and support guide as claimed in claim 1, wherein said adjusting and securing means includes:
   an adjusting slot in said base plate and a corresponding adjusting slot in said top plate;
   an adjusting aperture in said fence;
   a bolt passing through said base plate slot, said adjusting aperture, and said top plate slot and having a nut at one end for securing said plates and said fence in fixed relation to one another.

6. A cutting and support guide as claimed in claim 1, wherein:
   said base plate includes opposed upper and lower surfaces and a peripheral edge substantially perpendicular to said surfaces; and
   said fence member includes a shoulder portion for abutting said peripheral edge when said fence member is secured in fixed relation to said plates.

* * * * *